(12) United States Patent
Lehman et al.

(10) Patent No.: US 8,799,116 B2
(45) Date of Patent: Aug. 5, 2014

(54) PROCESS AND SYSTEM FOR AUTOMATED COLLECTION OF BUSINESS INFORMATION FROM A BUSINESS ENTITY'S ACCOUNTING SYSTEM

(75) Inventors: Guy P. Lehman, Randolph, NJ (US); Neel Chauhan, Montclair, NJ (US); Andres Benvenuto, Morristown, NJ (US); Perry Ziff, Dix Hills, NY (US)

(73) Assignee: The Dun & Bradstreet Corporation, Short Hills, NJ (US)

( * ) Notice: Subject to any disclaimer, the term of this patent is extended or adjusted under 35 U.S.C. 154(b) by 627 days.

(21) Appl. No.: 11/904,737

(22) Filed: Sep. 28, 2007

(65) Prior Publication Data

US 2008/0249902 A1   Oct. 9, 2008

Related U.S. Application Data

(60) Provisional application No. 60/848,203, filed on Sep. 29, 2006.

(51) Int. Cl.
| | | |
|---|---|---|
| G07B 17/00 | (2006.01) | |
| G07F 19/00 | (2006.01) | |
| G06Q 40/00 | (2012.01) | |
| G06Q 40/02 | (2012.01) | |
| G06Q 30/04 | (2012.01) | |
| G06Q 20/10 | (2012.01) | |
| G06Q 20/40 | (2012.01) | |
| G06Q 20/04 | (2012.01) | |

(52) U.S. Cl.
CPC ............... *G06Q 40/10* (2013.01); *G06Q 40/02* (2013.01); *G06Q 40/00* (2013.01); *G06Q 30/04* (2013.01); *G06Q 20/10* (2013.01); *G06Q 20/40* (2013.01); *G06Q 20/04* (2013.01)
USPC ................................................ 705/30; 705/44

(58) Field of Classification Search
CPC ....... G06Q 40/10; G06Q 40/02; G06Q 40/00; G06Q 30/04; G06Q 20/10; G06Q 20/40; G06Q 20/04
USPC ...................................................... 705/30, 44
See application file for complete search history.

(56) References Cited

U.S. PATENT DOCUMENTS

| | | | | |
|---|---|---|---|---|
| 5,201,010 | A | * | 4/1993 | Deaton et al. .................. 382/139 |
| 5,319,544 | A | * | 6/1994 | Schmerer et al. ............... 705/28 |
| 5,412,769 | A | * | 5/1995 | Maruoka et al. ............... 345/440 |
| 5,446,885 | A | * | 8/1995 | Moore et al. ........................... 1/1 |
| 5,787,405 | A | | 7/1998 | Gregory |
| 5,796,832 | A | * | 8/1998 | Kawan ............................. 705/65 |
| 5,956,697 | A | * | 9/1999 | Usui ................................ 705/32 |
| 6,070,152 | A | * | 5/2000 | Carey et al. ..................... 705/35 |

(Continued)

OTHER PUBLICATIONS

Peer-based approach for analytical procedures by Hoitash, Rani, Auditing 25.2 (Nov. 2006): pp. 53-84.*

(Continued)

*Primary Examiner* — Matthew Gart
*Assistant Examiner* — Harshad Parikh
(74) *Attorney, Agent, or Firm* — Ohlandt, Greeley, Ruggiero & Perle, L.L.P.

(57) ABSTRACT

There is provided a method, performed by a processor. The method includes obtaining accounting data from a first database, and sending the accounting data to a second database, wherein the second database is located remotely from the first database.

19 Claims, 10 Drawing Sheets

(56) References Cited

U.S. PATENT DOCUMENTS

| | | | |
|---|---|---|---|
| 6,078,891 A * | 6/2000 | Riordan et al. | 705/7.34 |
| 6,078,924 A * | 6/2000 | Ainsbury et al. | 1/1 |
| 6,115,690 A * | 9/2000 | Wong | 705/7.27 |
| 6,226,624 B1 * | 5/2001 | Watson et al. | 705/44 |
| 6,249,769 B1 * | 6/2001 | Ruffin et al. | 705/7.13 |
| 6,385,595 B1 * | 5/2002 | Kolling et al. | 705/40 |
| 6,400,722 B1 * | 6/2002 | Chuah et al. | 370/401 |
| 6,415,291 B2 | 7/2002 | Bouve et al. | |
| 6,571,149 B1 * | 5/2003 | Hahn-Carlson | 700/216 |
| 6,609,113 B1 * | 8/2003 | O'Leary et al. | 705/39 |
| 6,856,978 B2 * | 2/2005 | Szydlowski | 705/64 |
| 6,931,407 B1 | 8/2005 | Brown | |
| 6,934,692 B1 * | 8/2005 | Duncan | 705/35 |
| 6,950,809 B2 * | 9/2005 | Dahan et al. | 705/76 |
| 7,016,856 B1 * | 3/2006 | Wiggins | 705/2 |
| 7,778,895 B1 * | 8/2010 | Baxter et al. | 705/31 |
| 7,870,046 B2 * | 1/2011 | Gupta | 705/30 |
| 2001/0032183 A1 * | 10/2001 | Landry | 705/40 |
| 2002/0038305 A1 * | 3/2002 | Bahl et al. | 707/100 |
| 2002/0046116 A1 * | 4/2002 | Hohle et al. | 705/14 |
| 2002/0065752 A1 * | 5/2002 | Lewis | 705/35 |
| 2003/0097331 A1 * | 5/2003 | Cohen | 705/39 |
| 2003/0140004 A1 * | 7/2003 | O'Leary et al. | 705/39 |
| 2003/0158811 A1 * | 8/2003 | Sanders et al. | 705/39 |
| 2003/0200145 A1 | 10/2003 | Krassner et al. | |
| 2003/0212617 A1 * | 11/2003 | Stone et al. | 705/30 |
| 2004/0010435 A1 | 1/2004 | Stewart et al. | 705/8 |
| 2004/0049449 A1 * | 3/2004 | Martinelli | 705/38 |
| 2004/0049459 A1 * | 3/2004 | Philliou et al. | 705/40 |
| 2004/0059651 A1 * | 3/2004 | MaGuire et al. | 705/30 |
| 2004/0064375 A1 * | 4/2004 | Randell et al. | 705/26 |
| 2004/0078271 A1 * | 4/2004 | Morano et al. | 705/19 |
| 2004/0111342 A1 * | 6/2004 | Wang | 705/35 |
| 2004/0122757 A1 * | 6/2004 | Wang | 705/35 |
| 2004/0128218 A1 * | 7/2004 | Wang | 705/35 |
| 2004/0148233 A1 * | 7/2004 | Lee | 705/30 |
| 2004/0148234 A1 * | 7/2004 | Gonen-Friedman et al. | 705/30 |
| 2004/0172360 A1 * | 9/2004 | Mabrey et al. | 705/40 |
| 2004/0210509 A1 * | 10/2004 | Eder | 705/37 |
| 2004/0230508 A1 * | 11/2004 | Minnis et al. | 705/35 |
| 2004/0243503 A1 * | 12/2004 | Eng et al. | 705/37 |
| 2005/0038721 A1 * | 2/2005 | Goeckel et al. | 705/30 |
| 2005/0065845 A1 * | 3/2005 | DeAngelis | 705/14 |
| 2005/0144125 A1 * | 6/2005 | Erbey et al. | 705/40 |
| 2005/0165699 A1 * | 7/2005 | Hahn-Carlson | 705/67 |
| 2005/0171862 A1 * | 8/2005 | Duncan | 705/26 |
| 2005/0222929 A1 * | 10/2005 | Steier et al. | 705/35 |
| 2005/0240467 A1 * | 10/2005 | Eckart et al. | 705/10 |
| 2005/0269398 A1 * | 12/2005 | Robinson et al. | 235/380 |
| 2005/0283416 A1 * | 12/2005 | Reid et al. | 705/35 |
| 2006/0041487 A1 * | 2/2006 | Santalo et al. | 705/30 |
| 2006/0085332 A1 * | 4/2006 | Imrey et al. | 705/39 |
| 2006/0149668 A1 * | 7/2006 | Zafrir | 705/39 |
| 2006/0161485 A1 * | 7/2006 | Meldahl | 705/35 |
| 2006/0173772 A1 * | 8/2006 | Hayes et al. | 705/37 |
| 2006/0180657 A1 * | 8/2006 | Phillips et al. | 235/379 |
| 2006/0190393 A1 * | 8/2006 | Martin et al. | 705/37 |
| 2006/0212315 A1 * | 9/2006 | Wiggins | 705/2 |
| 2006/0212486 A1 * | 9/2006 | Kennis et al. | 707/200 |
| 2006/0218060 A1 * | 9/2006 | Lawlor | 705/32 |
| 2006/0224473 A1 * | 10/2006 | Nelson et al. | 705/30 |
| 2006/0224475 A1 * | 10/2006 | Kramer et al. | 705/30 |
| 2006/0229958 A1 * | 10/2006 | Sergio et al. | 705/35 |
| 2006/0247987 A1 * | 11/2006 | Busch et al. | 705/30 |
| 2006/0248010 A1 * | 11/2006 | Krishnamoorthy et al. | 705/40 |
| 2006/0259316 A1 * | 11/2006 | Breslin et al. | 705/1 |
| 2006/0259390 A1 * | 11/2006 | Rosenberger | 705/35 |
| 2006/0266819 A1 * | 11/2006 | Sellen et al. | 235/379 |
| 2006/0282403 A1 * | 12/2006 | Kroetsch et al. | 707/2 |
| 2008/0004887 A1 * | 1/2008 | Brunswig et al. | 705/1 |
| 2008/0249902 A1 * | 10/2008 | Lehman et al. | 705/30 |
| 2009/0157565 A1 * | 6/2009 | Breck | 705/36 T |
| 2013/0231962 A1 * | 9/2013 | Au Li | 705/4 |
| 2013/0232043 A1 * | 9/2013 | Patel | 705/34 |

OTHER PUBLICATIONS

Extended European Search Report dated Jul. 8, 2010 for corresponding European Patent Application No. 07852452.7.

Office Action dated Apr. 19, 2013 corresponding to Canadian Patent Application No. 2,664,741, 4pp.

* cited by examiner

Upload Detail

Statement Date

Date: 9/24/07  09:46:10 AM
Company: Omicron Widgets, LLC
D-U-N-S Number: 123456789

Customer Name

| Customer | Current | Over 30 | Over 60 | Over 90 | Total |
|---|---|---|---|---|---|
| Alpha Widget Corp. | 295.00 | 295.00 | | | 590.00 |
| Beta Widgets, LLC | 652.60 | | | | 652.60 |
| Gamma, Delta & Epsilon, LLP | 0.00 | | 446.85 | | 446.85 |

Fig. 10

PROCESS AND SYSTEM FOR AUTOMATED COLLECTION OF BUSINESS INFORMATION FROM A BUSINESS ENTITY'S ACCOUNTING SYSTEM

BACKGROUND OF THE INVENTION

1. Field of the Invention

An automated embedded data collection system enables a collection of business information, e.g., identity and trade data, directly through a small business' accounting software applications. More specifically, business information is collected by leveraging software applications and processes to push trade and business identity data and/or financial credit data, directly from the small business' accounting programs to a credit company's data storage facility. This manner of collecting business information enhances quality of collected data and increase accuracy and depth of responses to customer credit inquiries.

2. Discussion of the Background Art

Business information companies and directory providers do not currently use software applications to collect financial, trade, and credit data from small to medium businesses. However, there is tremendous value in such data, as access to such data would allow collection and/or credit agencies to understand credit-worthiness of many small to medium businesses with which the agencies transact business.

Business performance information, which includes, but is not limited to, accounts receivable or trade information, has become extremely important in today's business marketplace, both in making credit decisions and in establishing reciprocal trade relationships between companies. Banks, CPA firms, corporations, credit companies, insurers and other underwriters have a need to monitor business performance information of their customers in order to minimize risk and avoid financial surprises. Moreover, the stability of manufacturing and service providing companies is often dependent on one or more key component(s) or services suppliers. Financial or operating problems at these suppliers could cause a chain reaction that adversely affects their business partners. As a result, manufacturing and service companies also have a need to review business performance information of suppliers and other partner businesses upon which they are dependent in order to insure that their future business operations remain stable.

Financial information on publicly traded companies is easily obtainable due to standardization of financial record keeping in accordance with generally accepted accounting principles (GAAP) and quarterly filing and disclosure requirements imposed by the U.S. Securities and Exchange Commission (SEC). However, for partnerships and other private business ventures, obtaining accurate and standardized financial information, e.g., accounts receivable or trade information, is much more difficult. Private businesses typically maintain their own financial records on site, or through assistance of an outside accountant, using one of a number of commercial off the shelf (COTS) financial accounting software programs. Such software programs, for example QuickBooks®, are ubiquitously well known in the accounting profession. QuickBooks® is a registered trademark of Intuit, Inc., or one of its subsidiaries. All of these programs, in one form or another, maintain financial records including balance sheets, income statements, individual account statements and other well known financial records.

As a result of the decentralized and unreported nature of small or private business financial information, it is often difficult for interested parties to obtain standardized financial information on businesses with which they are or may be interested in doing business. It may also be difficult to perform relevant comparisons between similarly situated businesses. Typically, companies in such a position will utilize a financial data gathering firm, such as Dun & Bradstreet, to generate a report summarizing any known financial information about the business of interest. Such a report has come to be known in the profession as a "D & B." A problem with this type of financial reporting is that information about a company, obtained by these financial information gathering firms, is largely obtained through solicitation from the company itself. Once this self-reported information gets into the information gathering firm's possession, the submitting company no longer has control over its distribution. As a result, companies are generally reluctant to provide full disclosure, and may even be incentivized to mislead companies seeking to gather information on them. Also, because financial data gathering firms must rely on the willingness of businesses to disclose information to them, it is unlikely that uniform information will be available for all reporting companies. As a result, a consumer of such information will have difficulty in making a balanced comparison between two or more similarly situated businesses based on financial metrics. Another problem with conventional financial data gathering firms is that the data collection method may be disjointed, consisting of various sources that must be manually assimilated into a format that is valuable to consumers of such information. This is a labor intensive process which increases the ultimate cost for such information and likely reduces its accuracy.

Accordingly, there is a need for an improved system for sharing financial information of businesses with interested parties which ameliorates or overcomes the deficiencies of known systems.

One such system for selective sharing of business performance information is disclosed in U.S. Patent Publication No. 2005/0240467, which discloses an automated system for allowing a submitter business to selectively share business performance information with requester businesses through a business performance information sharing data center computer system over the Internet. A submitter business uploads a data file including business performance information such as a trial balance report generated by the business' own accounting software program. The uploaded file is converted from the submitter-defined format to a standardized format. Various business performance data analyses are performed on the standardized-format data including generating standardized business performance reports and analyzing the data in accordance with financial metrics. After the business performance data have been formatted and analyzed, the submitter will specify one or more companies authorized to view the business performance data including specifying a level of business performance detail, from a plurality of levels of detail, and/or a business performance time period for which that authorized company may view business performance information.

Although some companies collect trade and identity information via manual processes, there is, however, a need for an automatic system that collects trade and identity information.

SUMMARY OF THE INVENTION

There is provided a method, performed by a processor. The method includes obtaining accounting data from a first database, and sending the accounting data to a second database, wherein the second database is located remotely from the first database.

A system and method, as described herein, employed for collecting and retrieving financial transaction data from small to medium businesses directly from their financial accounting software, overcomes a substantial credit information deficiency that now exists in the credit industry and, allows for creditors and business partners to obtain more credit and business reports on small to medium companies. The preferred embodiment differs from the aforementioned conventional systems in that it is embedded directly into a customer's existing software application, as opposed to just providing a hosted site to which to upload data, and provides a trio of software, process, and end-user incentives for the purpose of gathering identity and trade information from business software applications.

Embedded data collection enables the automated collection of business information, including trade and identity information, directly through business software applications by leveraging business software applications and processes to push and pull data from a customer's software applications to a credit company. For example, at a determined frequency a plug-in to the business software application will trigger an extraction (pull) from the appropriate data sources and aggregate, organize, and encrypt this data—then the plug-in will send (push) this data to the credit company.

BRIEF DESCRIPTION OF THE DRAWINGS

FIG. 4 is a block diagram of FIG. 3, step 1, for registration and downloading of a plug-in.

FIG. 10 is a summary view of trade data.

DETAILED DESCRIPTION OF THE INVENTION

Figure 1:
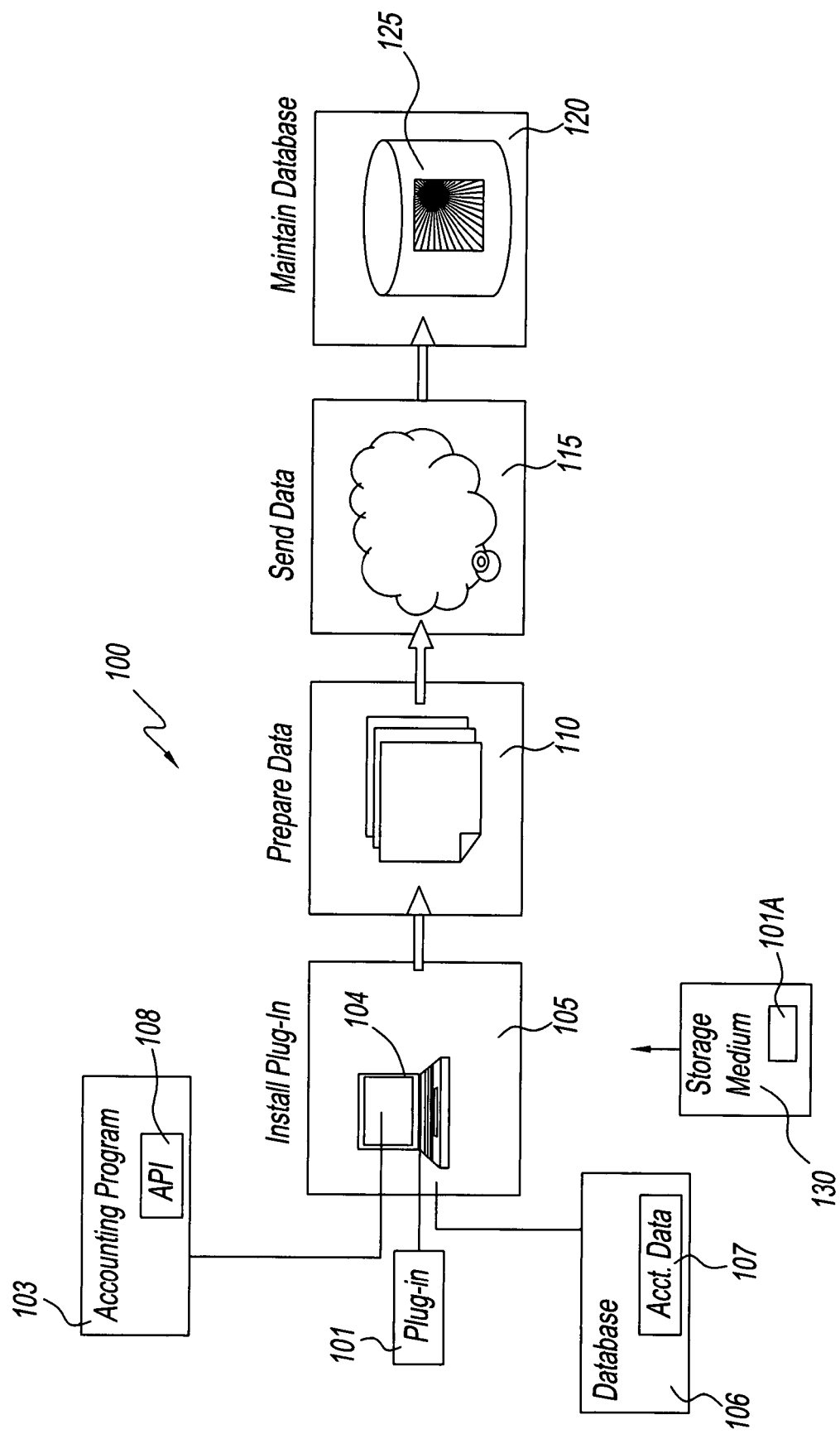
FIG. 1 is a block diagram of an embedded data collection plug-in process.

FIG. 1 is a block diagram of a process 100. A system employing process 100 includes a processor, i.e., a computer 104, having an associated memory with an accounting program 103 installed therein. Computer 104 is coupled to a database 106, and also coupled, via a communications link, to a database 125. Database 106 has accounting data 107 residing therein. Computer 104 maintains accounting data 107 by executing instructions that are embodied in accounting program 103. Accounting data 107 may include, for example, business performance information, accounts receivable data, and trade information. The accounts receivable data may, in turn, also include accounts receivable aging data.

Database 106 is maintained by a first business entity, e.g., a business that produced accounting data 107, and database 125 is maintained by a second business entity, e.g., a credit company that evaluates accounting data 107 to prepare a report for a creditor of the first business entity. Alternatively, database 106 may be maintained by an accounting firm that manages the books of several businesses, where accounting data 107 pertains to operations of the several businesses.

Although computer 104 is represented in FIG. 1 as a standalone computer, computer 104 may be configured with a plurality of devices (e.g., processors, memories, servers) coupled to one another via a network. Many implementations of database 106 are possible. Some such implementations are a flat file, a relational database management system (RDBMS), or a collection of spreadsheets.

In step 105, a plug-in 101 that interfaces with accounting program 103 is installed into computer 104. Plug-in 101 is a program module of instructions for controlling certain functions of computer 104. The functionality of plug-in 101 is described below.

In step 110, computer 104 obtains accounting data 107 from database 106, and prepares accounting data 107 for transmission to database 125. More specifically, computer 104, pursuant to instructions contained in plug-in 101, invokes an application programming interface (API) 108 of accounting program 103 to locate, access, and extract accounting data 107 from database 106, and prepares to send accounting data 107 to database 125. For example, computer 104 will locate the appropriate sources of data, determined during the installation of plug-in 101, to identify qualifying records, extract/select those records, and make additional extracts/selects from other tables to make this data a complete record (e.g., source name, details, current information, relevant aged data). Plug-in 101 may, therefore, locate accounting data 107 by using techniques such as, for example, parsing a text file, or querying records in a RDBMS, or extracting cells from a spreadsheet.

In step 115, computer 104 sends accounting data 107 over a communication link automatically to database 125. A pull might be, for example, scheduled to occur a pre-determined time or at a predetermined interval of time. Additionally, a user of computer 104 can initiate a transfer of accounting data 107 from database 106 to database 125.

In step 120, database 125 receives accounting data 107. Database 125 may be managed, for example, by a credit company that creates or updates business records based upon accounting data 107.

Although plug-in 101 is represented a being installed into computer 104, plug-in 101 may be embodied as a machine-readable encoded program, i.e., a plug-in 101A, and stored on a storage medium 130 for subsequent installation into computer 104. Examples of storage medium 130 include, but are not limited to an optical storage medium, a magnetic storage medium, a magneto-optical storage medium, a flash memory medium and a ROM chip.

Figure 2:
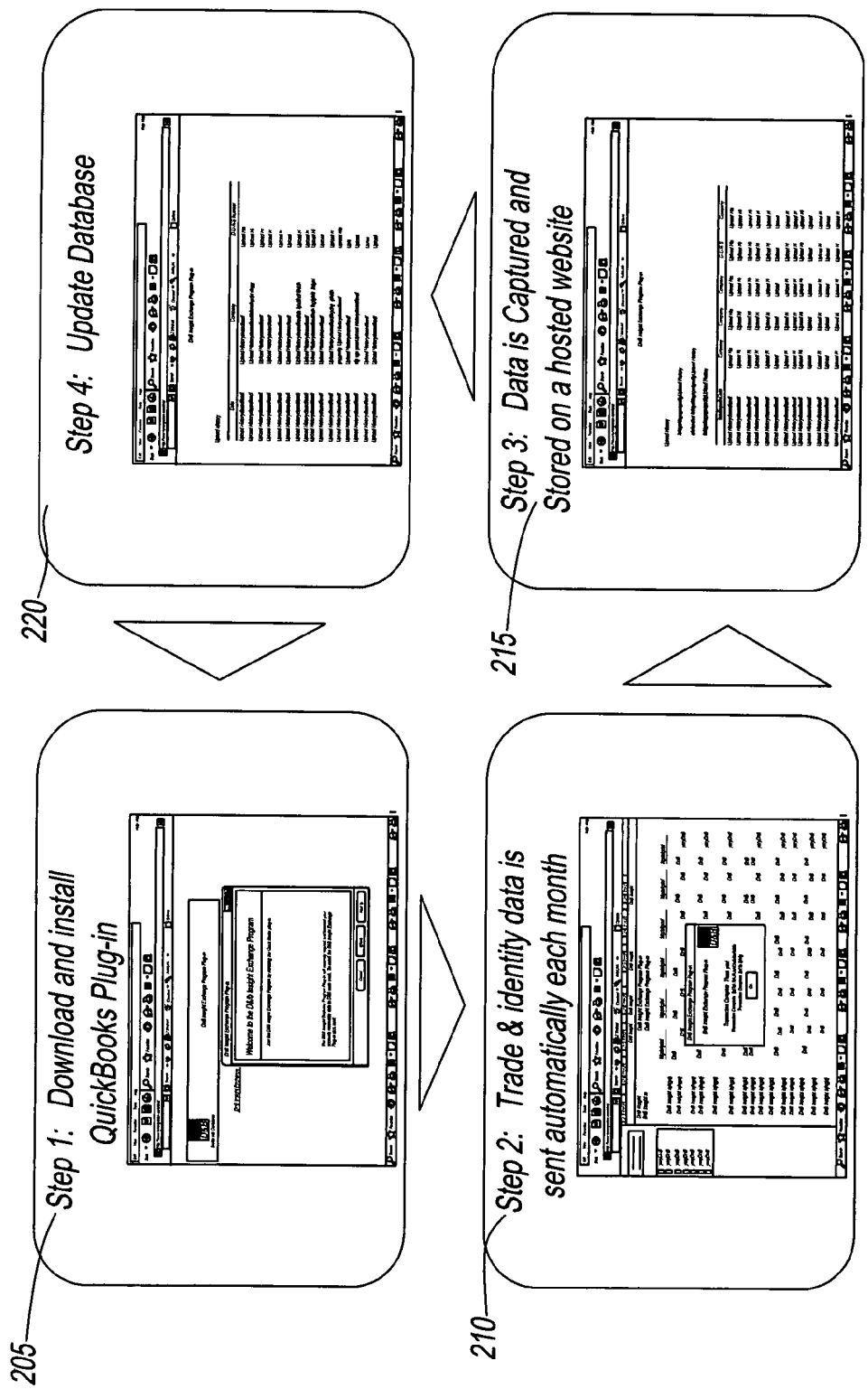
FIG. 2 depicts various screen shots of an embedded data collection plug-in and retrieval process.

FIG. 2 shows four screen shots, i.e., 205, 210, 215 and 220, in an exemplary embodiment of process 100.

Screen shot 205 is a view of a user's financial accounting software after plug-in 101 has been installed on computer 104, and successfully loaded.

Screenshot 210 demonstrates the pushing or pulling of accounting data 107, e.g, trade data, from accounting program 103, e.g., a user's accounting program, to database 125, e.g., a database of a credit company, on a monthly schedule.

Screenshot 215 demonstrates a capturing and storing of trade data, accounts receivable data, and/or financial data on a hosted website.

Screenshot 220 demonstrates an updating of database 125, maintained by or for a credit company, with detailed trade data, accounts receivable data, and/or financial data sent to the credit company pursuant to instructions in plug-in 101.

Figure 3:
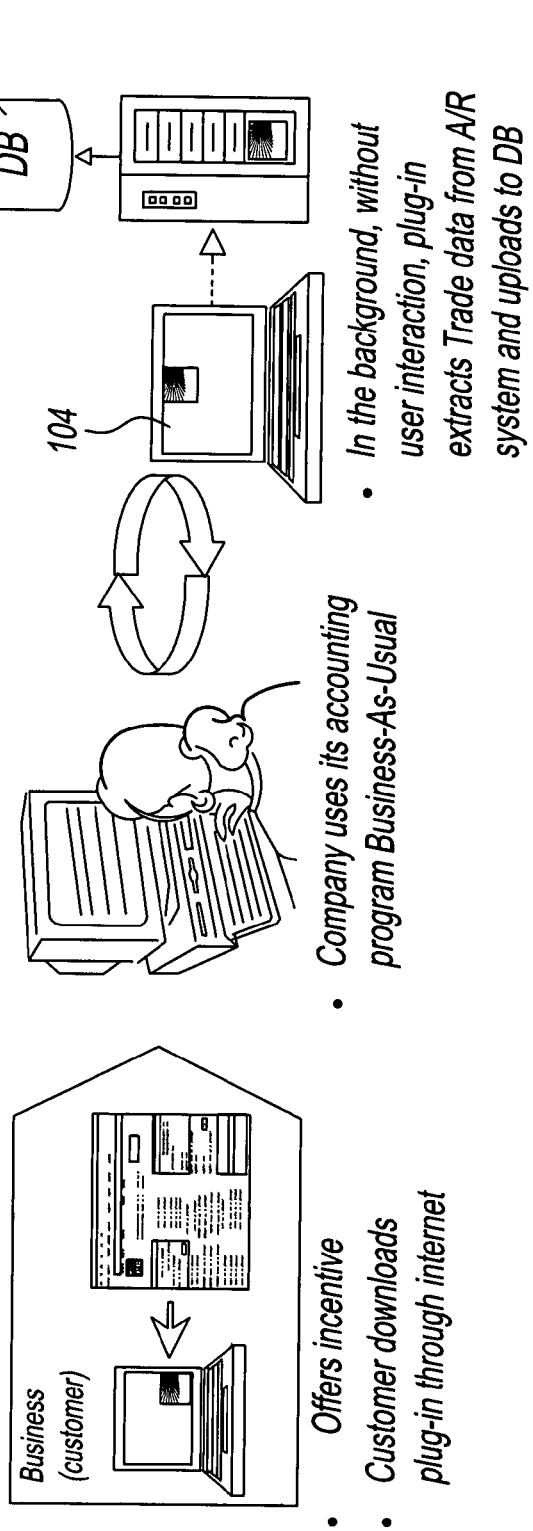
FIG. 3 is a diagram of a three-step process for plug-in installation and operation.

FIG. 3 is a diagram of an exemplary embodiment of a three-step process for installation and operation of plug-in 101.

In step 305, a user, e.g., a customer, downloads and installs plug-in 101 onto computer 104. The download may be accomplished via a communications link. In this regard, the customer may visit an Internet website of a credit company that invites the customer to download plug-in 101. The invitation may be presented in the form of an incentive such as an enrollment offer, or an advertisement. Additionally, the customer registers plug-in 101.

In step 310, an initial transfer of data between the customer and the credit company takes place. The customer uses accounting program 103 as would be done in the ordinary course of business. In step 310, financial data accumulate as usual, but the data are also prepared for transmission to database 125.

In step 315, a periodic transfer of data between computer 104 and database 125 takes place. Computer 104 extracts, in the background and without a requirement for user interaction, accounting data 107 from database 106, and sends accounting data 107 to database 125 over a communication link. The time at which, and the conditions under which, the extraction and upload are performed are governable by user-configurable triggers. Plug-in 101 is also user-upgradable.

After step 315 is completed, operation returns to step 310. Operation remains at step 310 until a proper entry point into step 315 is again reached.

Figure 4:
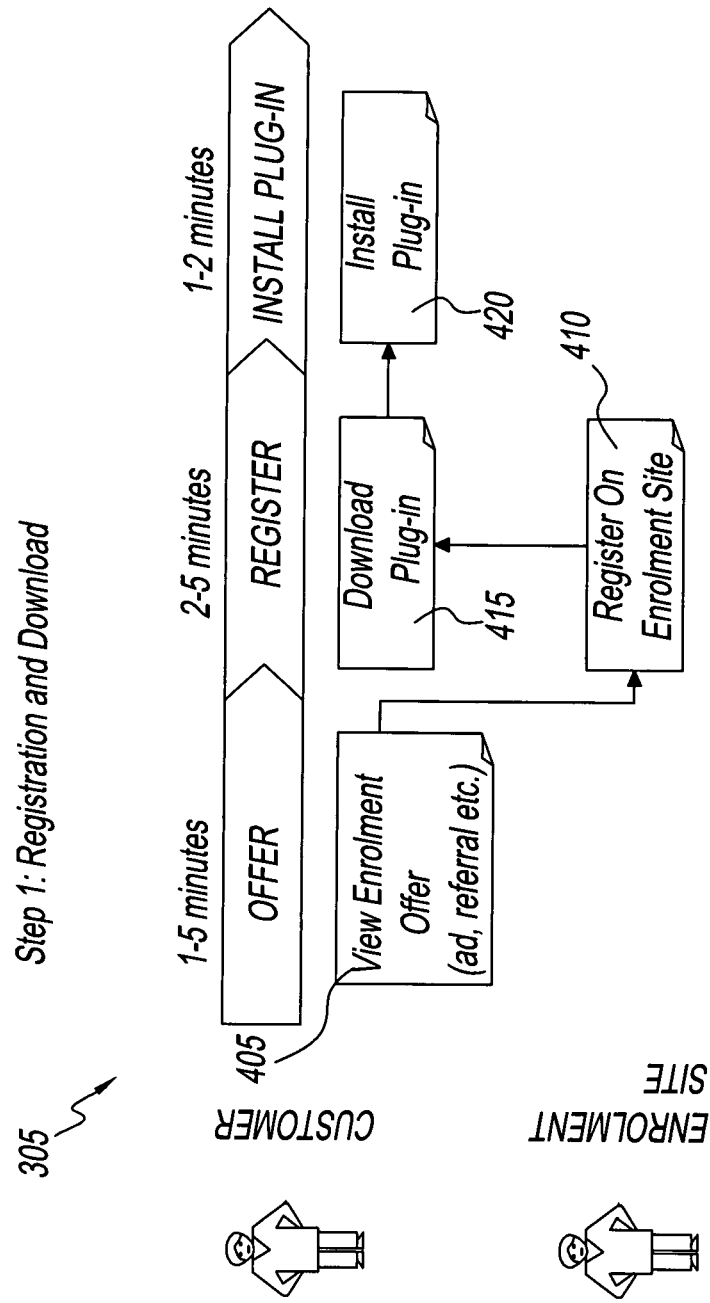

FIG. 4 depicts details of step 305. In step 405, the customer views an enrollment offer, such as an advertisement, for plug-in 101. In step 410, the customer registers to use plug-in 101 and provides registration information via accounting program 103. In step 415, upon successful registration, the customer is permitted to download plug-in 101. In step 420, the customer installs plug-in 101 directly onto computer 104.

Figure 5:
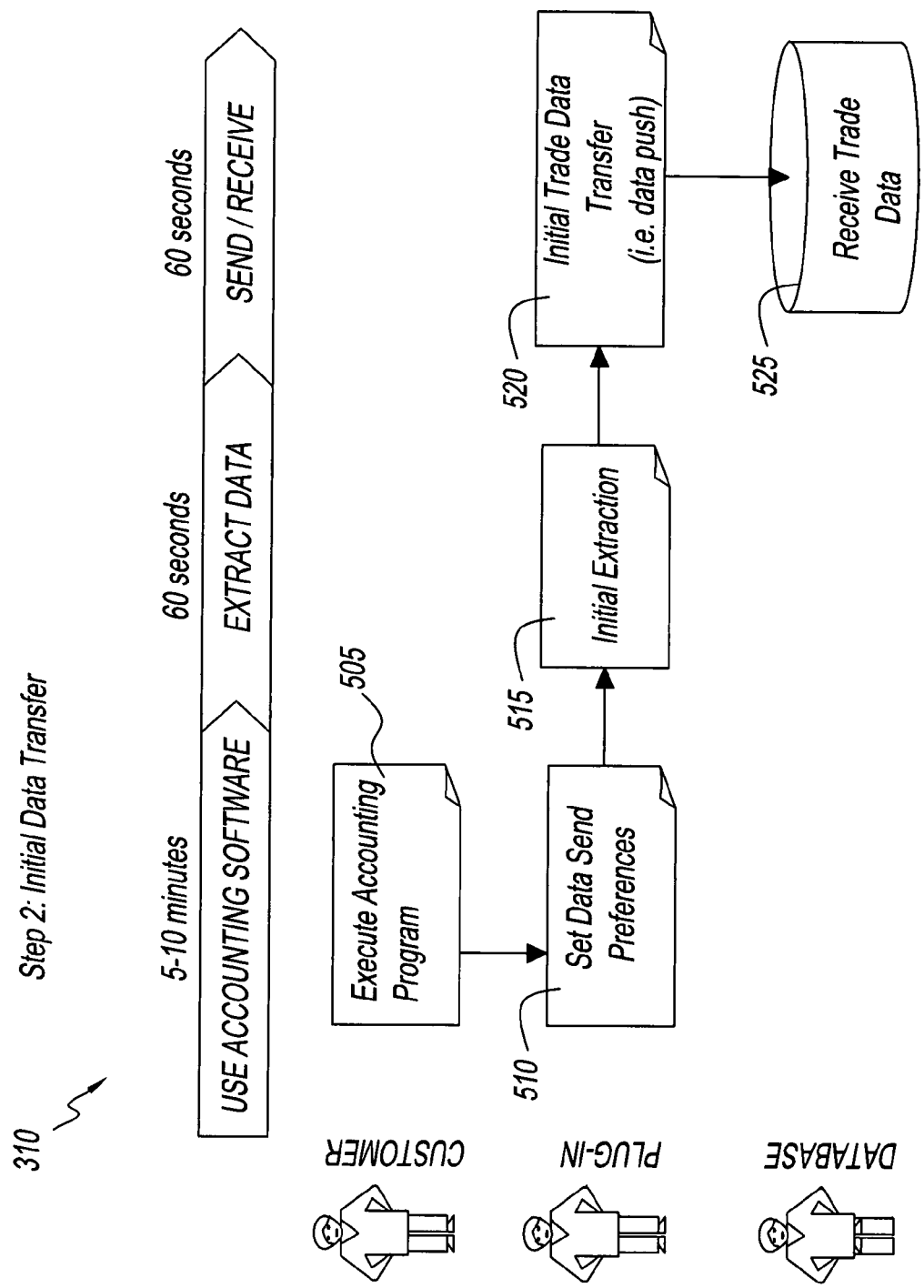
FIG. 5 is a block diagram of FIG. 3, step 2, for initial data transfer from customer to database supplier.

FIG. 5 depicts details of step 310, wherein the initial transfer of data between the customer and the credit company takes place. In step 505, in order to begin the initial data transfer, the customer executes accounting program 103. Thereafter, in step 510, the customer is prompted to provide data transfer permission and to set preferences. Such preferences can include an identification of which company files will be sent, and which specific customer records should be sent to the credit company. In step 515, computer 104 locates and extracts accounts receivable data, trade data, or other financial information from database 106. Thereafter, in step 520, the extracted data are pushed to the credit company over a communication link. One way in which this push can be accomplished is with a secure HTTPS data transfer, either hardwired or wireless, over the Internet. In step 525, the credit company receives the pushed data into database 125 to await processing.

Figure 6:
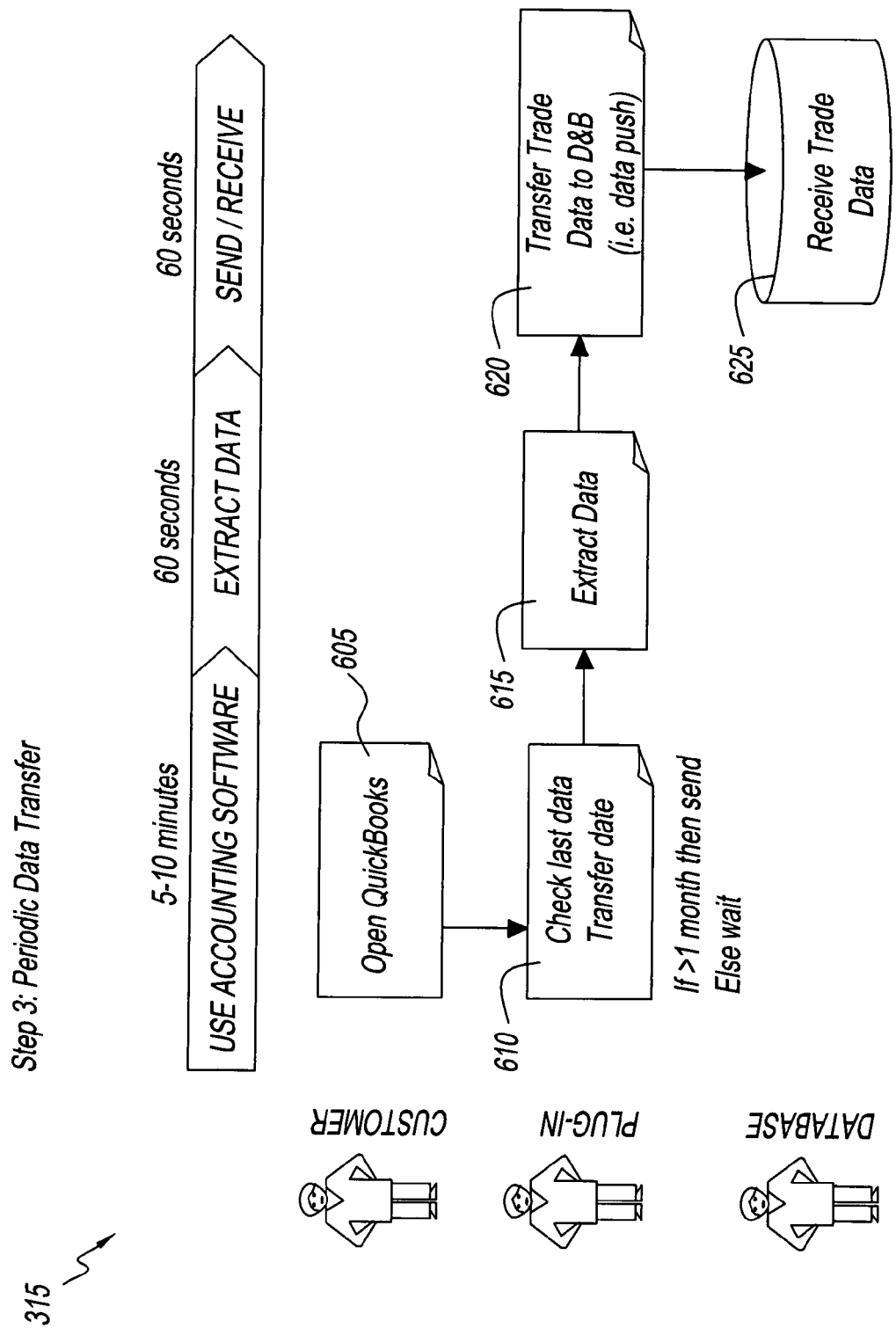
FIG. 6 is a block diagram of FIG. 3, step 3, for periodic data transfer.

FIG. 6 depicts details of step 315, wherein the periodic transfer of data between the customer and credit company takes place. In step 605, to initiate periodic data transfer, the customer executes accounting program 103. In step 610, computer 104 checks the last transferred data. If the last transferred data are older than a certain age, e.g., a month, then the current data are extracted and treated as explained below. If the last transferred data are not older than that certain age, then computer 104 will wait to perform further actions until the last transferred data are older than that certain age. Given data of proper age, then in step 615 computer 104 locates and extracts the correct accounts receivable data, trade data, and/or financial information from database 106. In step 620, extracted trade information is either pushed or pulled to database 125 over a communications link. As mentioned above, one possible way to perform pushing or pulling is to use a secure HTTPS data transfer over the Internet. In step 625, the credit company then receives these data into database 125 to await further processing.

Figure 7:
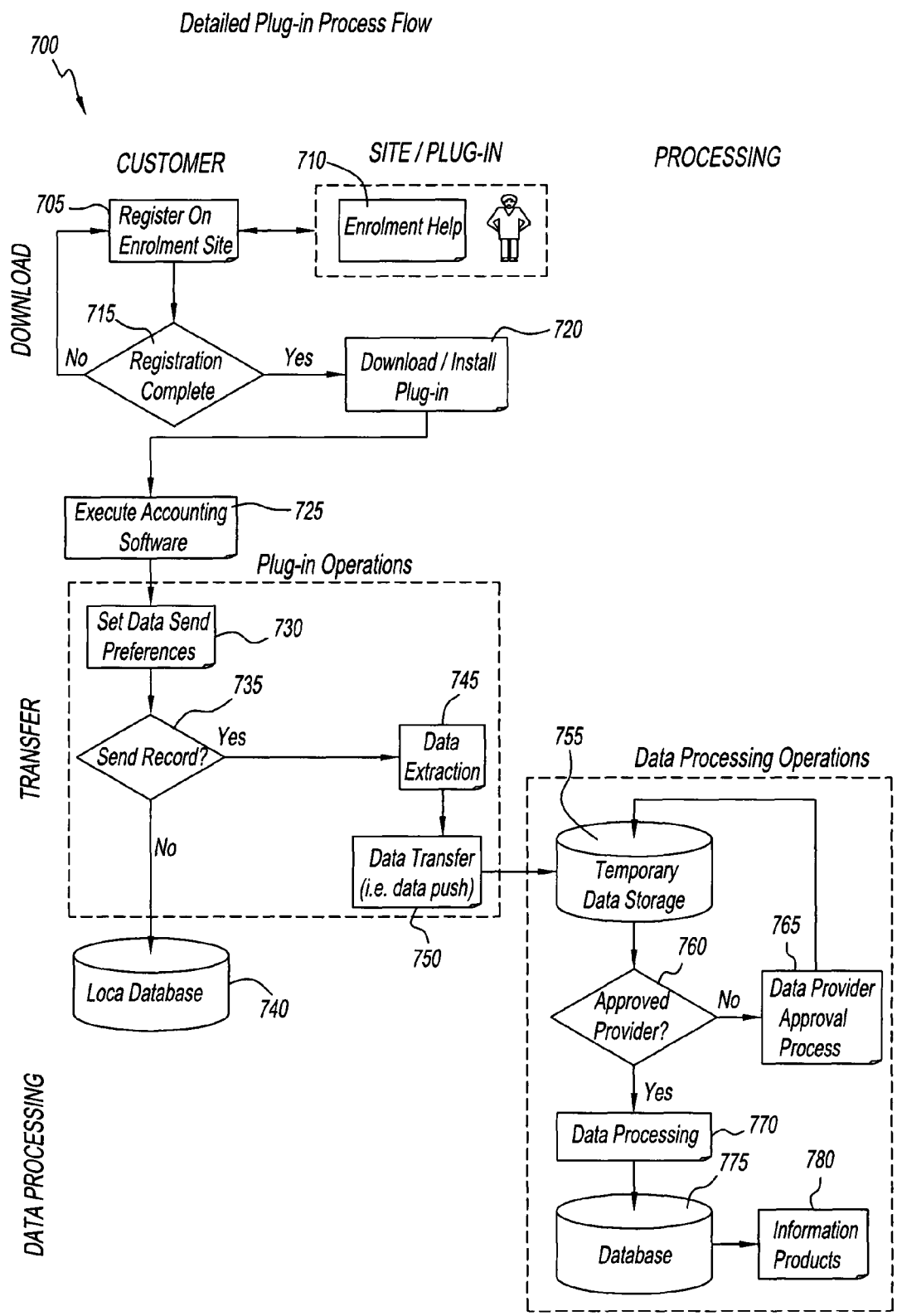
FIG. 7 is a flow diagram of a plug-in process.

FIG. 7 is a flow diagram of a plug-in process 700.

In step 705, process 700 registers a user on an enrolment site. If the user requires registration help, then process 700 progresses to step 710. If the user does not require registration help, then process 700 progresses to step 715.

In step 710 the user can seek help from an enrolment help desk. After completion of step 710, process 700 returns to step 705.

In step 715, process 700 determines if registration is complete. If registration is not complete, then process 700 returns to step 705. If registration is complete, then process 700 advances to step 720.

In step 720, plug-in 101 is downloaded and installed. From step 720, process 700 progresses to step 725.

In step 725, the user executes accounting program 103. From step 725, process 700 progresses to step 730.

In step 730, the user sets data-sending preferences. From step 730, process 700 progresses to step 735.

In step 735, the user is prompted for permission to send accounting data 107 to the credit company. If permission is granted, then process 700 progresses to step 745. If permission is not granted, then process 700 progresses to step 740.

In step 740, the data-sending preferences are sent to database 106.

In step 745, data extraction is initiated. From step 745, process 700 progresses to step 750.

In step 750, data is transferred, by push or pull, to the credit company. From step 750, process 700 progresses to step 755.

In step 755, the credit company receives, into temporary storage, the data pushed or pulled in step 750. From step 755, process 700 progresses to step 760.

In step 760, the credit company determines if the user is an approved provider. If the user is not an approved provider, then process 700 progresses to step 765. If the user is an approved provider, then process 700 progresses to step 770.

In step 765, the user goes through a data provider approval process. From step 765, process 700 progresses to step 755.

In step 770, the data received in step 755 are processed. From step 770, process 700 progresses to step 775.

In step 775, the data processed in step 770 are stored in a database, e.g., database 125. From step 775, process 700 progresses to step 780.

In step 780, the data stored by step 775 are retrieved for use in preparation of information products for customers of the credit company.

Figure 8:
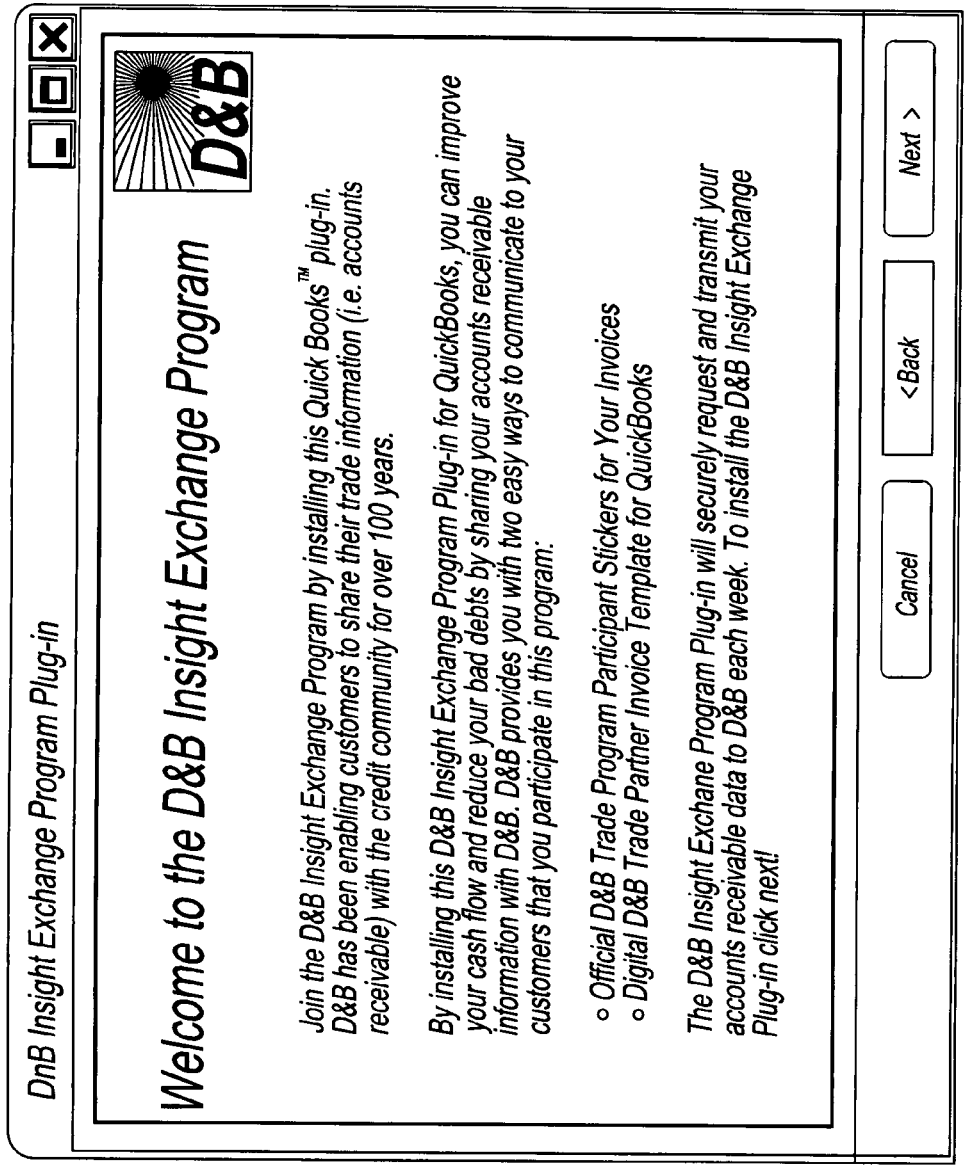
FIG. 8 is a screen shot of a dialog prompting a user to proceed with installation of a plug-in onto a computer.

FIG. 8 is a screen shot of a dialog prompting a user to proceed with installation of plug-in 101 onto computer 104. The dialog provides the user with basic information on the benefits of using plug-in 101.

Figure 9:
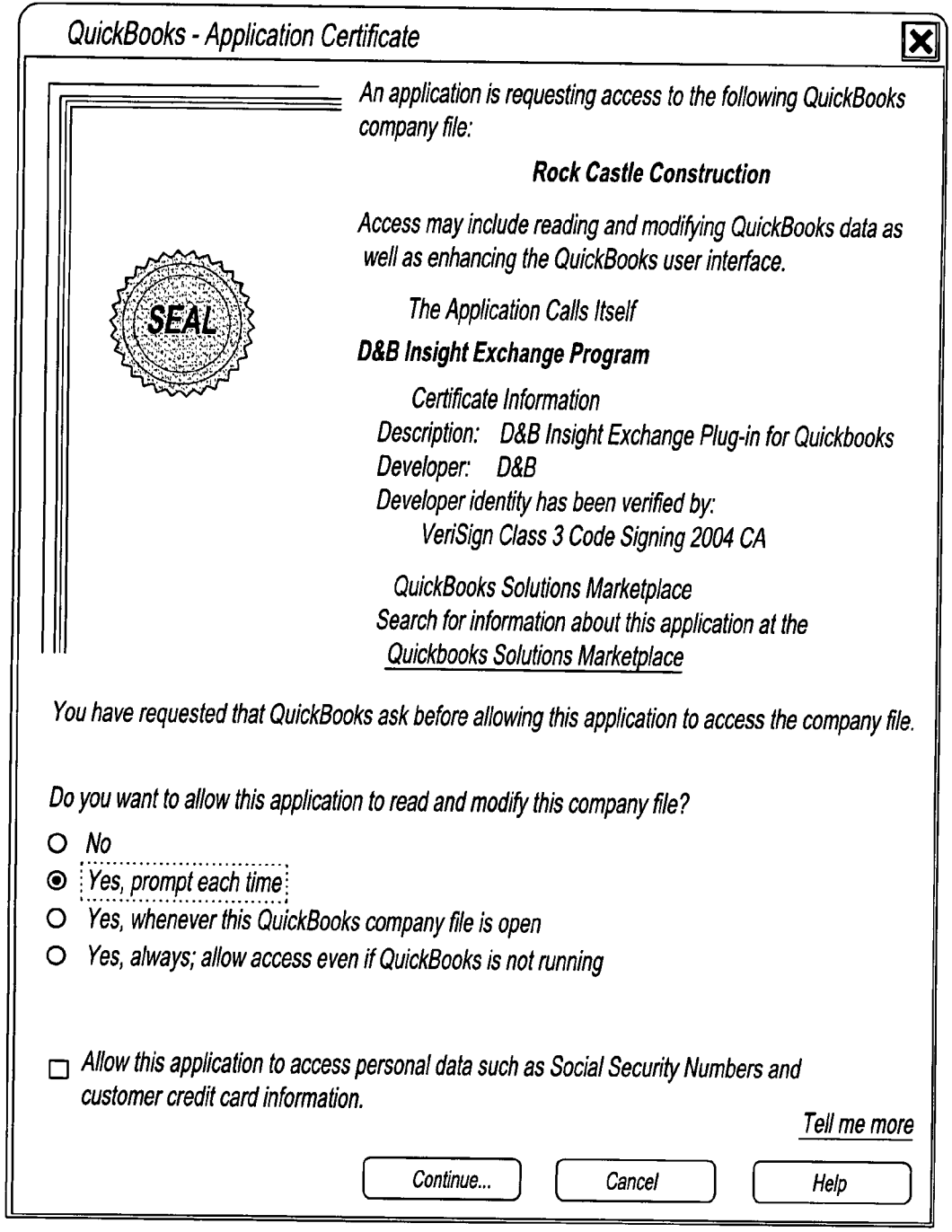
FIG. 9 is a screen shot of a dialog displayed by an accounting program.

FIG. 9 is a screen shot of a dialog displayed by accounting program 103. A user of accounting program 103 is being prompted to supply authorization for access by plug-in 101 to records maintained by accounting program 103 pertaining to a particular business's trade data. The user is presented with a variety of options, each representing a different level of authorization to be granted to plug-in 101 to access the particular business's trade data. These options range from denial of access, to at-will read-write access. Additionally the user is presented with an option to allow or disallow plug-in 101 to access personal information of individuals associated with the particular business.

FIG. 10 is a summary view of trade data, e.g. data transferred by step 750 of process 700. The summary view shows a statement date, the name of the entity that has transferred the data, e.g., the name of the entity from whose accounting program 103 computer 104 has retrieved the data, and an identification number used by a credit company to which the data are ultimately to be sent. Further, the summary view provides an entry for each customer of the user. The entry includes a customer name, an amount currently owed by the customer, amounts owed by the customer according to days late (that is, aging data or aging buckets, e.g. over 30, over 60 and so on), and a total amount due (i.e., a sum of current and overdue amounts).

While we have shown and described several embodiments in accordance with my invention, it is to be clearly understood that the same may be susceptible to numerous changes apparent to one skilled in the art. Therefore, we do not wish to be limited to the details shown and described but intend to show all changes and modifications that come within the scope of the appended claims.

What is claimed is:

1. A method, performed by a processor of a computer system having a memory communicatively connected to said processor, comprising:
    performing instructions embodied in a plug-in module that when installed into said memory, interfaces with an accounting program automatically at a time selected from the group consisting of a predetermined time, and a predetermined interval of time, in accordance with settings of said plug-in module that are configured by a user of said computer system after said plug-in module is installed into said memory, to accomplish actions of:
    (a) invoking an application program interface of said accounting program to access accounting data in a first database;
    (b) locating account receivable data in said accounting data;
    (c) extracting said account receivable data from said accounting data; and
    (d) sending said account receivable data to a second database, wherein said second database is located remotely from said first database,
    wherein said accounting program (i) resides in said memory, and (ii) contains instructions to control said processor to maintain said accounting data in said first database.

2. The method of claim 1, wherein said account receivable data comprises account receivable aging data.

3. The method of claim 1,
    wherein said first database is maintained by a first business entity; and
    wherein said second database is maintained by a second business entity.

4. The method of claim 1, wherein said sending is contingent upon permission for said sending being granted by a user of said accounting program.

5. The method of claim 1,
    wherein said accounting data is in a text file, and
    wherein said locating comprises parsing said text file.

6. The method of claim 1, wherein said processor automatically performs said invoking, locating, extracting and sending, in accordance with a schedule.

7. The method of claim 1, further comprising, prior to said performing:
    downloading said plug-in module to said processor via the Internet; and
    installing said plug-in module into said memory.

8. A computer system comprising:
    a processor; and
    a memory, communicatively connected to said processor, that contains a plug-in module that controls said processor to interface with an accounting program automatically at a time selected from the group consisting of a predetermined time, and a predetermined interval of a time, in accordance with settings of said plug-in module that are configured by a user of said computer system after said plug-in module is installed into said memory, to:
    (a) invoke an application program interface of said accounting program to access accounting data in a first database;
    (b) locate account receivable data in said accounting data;
    (c) extract said account receivable data from said accounting data; and
    (d) send said account receivable data to a second database, wherein said second database is located remotely from said first database,
    wherein said accounting program (i) resides in said memory, and (ii) contains instructions to control said processor to maintain said accounting data in said first database.

9. The computer system of claim 8, wherein said account receivable data comprises account receivable aging data.

10. The computer system of claim 8,
    wherein said first database is maintained by a first business entity; and
    wherein said second database is maintained by a second business entity.

11. The computer system of claim 8, wherein said accounting data is in a text file, and wherein said locating comprises parsing said text file.

12. The computer system of claim 8, wherein said processor automatically performs said invoking, locating, extracting and sending, in accordance with a schedule.

13. The computer system of claim 8, wherein said memory also contains instructions to control said processor to:
    download said plug-in module to said processor via the Internet; and
    install said plug-in module into said memory.

14. A storage medium comprising a plug-in module encoded thereon, wherein said plug-in module, when installed in a memory of a computer system having a processor communicatively connected to said memory, controls said processor to interface with an accounting program automatically at a time selected from the group consisting of a predetermined time, and a predetermined interval of a time, in accordance with settings of said plug-in module that are configured by a user of said computer system after said plug-in module is installed into said memory, to:
    (a) invoke an application program interface of said accounting program to access accounting data in a first database;
    (b) locate account receivable data in said accounting data;
    (c) extract said account receivable data from said accounting data; and
    (d) send said account receivable data to a second database, wherein said second database is located remotely from said first database,
    wherein said accounting program (i) resides in said memory, and (ii) contains instructions to control said processor to maintain said accounting data in said first database.

15. The storage medium of claim 14, wherein said account receivable data comprises account receivable aging data.

16. The storage medium of claim 14,
wherein said first database is maintained by a first business entity; and
wherein said second database is maintained by a second business entity.

17. The storage medium of claim 14,
wherein said accounting data is in a text file, and
wherein said locating comprises parsing said text file.

18. The storage medium of claim 14, wherein said processor automatically performs said invoking, locating, extracting and sending in accordance with a schedule.

19. The storage medium of claim 14, wherein said plug-in module is downloaded to said processor via the Interact, and thereafter installed in said memory.

* * * * *